(12) United States Patent
Gaash et al.

(10) Patent No.: US 10,936,257 B2
(45) Date of Patent: *Mar. 2, 2021

(54) GENERATION OF IMAGES

(71) Applicant: HP Indigo B.V., Amstelveen (NL)

(72) Inventors: Amir Gaash, Ness Ziona (IL); Steve Morris, Ness Ziona (IL); Shlomi Kramer, Ness Ziona (IL); Muhannad Ismael, Ness Ziona (IL); Guy Bibi, Nes Ziona (IL); Hadar Peled Vaissman, Nes Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/677,254

(22) Filed: Nov. 7, 2019

(65) Prior Publication Data
US 2020/0073600 A1 Mar. 5, 2020

Related U.S. Application Data

(63) Continuation of application No. 15/316,081, filed as application No. PCT/EP2014/061634 on Jun. 4, 2014, now Pat. No. 10,509,605.

(51) Int. Cl.
*G06F 3/12* (2006.01)
*G09F 3/00* (2006.01)
(Continued)

(52) U.S. Cl.
CPC .......... *G06F 3/1208* (2013.01); *G06F 3/1204* (2013.01); *G06F 3/1243* (2013.01);
(Continued)

(58) Field of Classification Search
CPC .................. G09F 3/00; G06F 3/1243
See application file for complete search history.

(56) References Cited

U.S. PATENT DOCUMENTS 4,958,221 A * 9/1990 Tsuboi ................. H04N 1/6027
358/406
5,982,950 A * 11/1999 Shah .................. G06K 7/10851
382/282
(Continued)

OTHER PUBLICATIONS

International Search Report and Written Opinion dated Feb. 13, 2015, PCT Patent Application No. PCT/EP2014/061634, filed Jun. 4, 2014, European Patent Office, 9 pages.
(Continued)

*Primary Examiner* — King Y Poon
*Assistant Examiner* — Michael Burleson
(74) *Attorney, Agent, or Firm* — Mannava & Kang

(57) ABSTRACT

Multiple packages are manufactured by defining a package template, with at least one individualized image area, and selecting at least one image seed. For each package, an index key is selected and, based on the selected index key, a plurality of image attribute modifications are determined from within applicable ranges of image attribute modifications. The determined image attribute modifications are applied to the image seed or seeds to generate respective images, and the image or images are applied to the respective individualized image area of the package.

18 Claims, 8 Drawing Sheets

(51) Int. Cl.
*G06K 15/02* (2006.01)
*G06Q 50/28* (2012.01)
*G06Q 30/02* (2012.01)
*B41J 3/407* (2006.01)

(52) U.S. Cl.
CPC .......... *G06F 3/1256* (2013.01); *G06F 3/1284* (2013.01); *G06K 15/024* (2013.01); *G06Q 30/0241* (2013.01); *G06Q 50/28* (2013.01); *G09F 3/00* (2013.01); *B41J 3/4075* (2013.01)

(56) References Cited

U.S. PATENT DOCUMENTS

| | | | | |
|---|---|---|---|---|
| 6,819,439 | B2 ‡ | 11/2004 | Hayashi | H04N 1/6011 358/1.13 |
| 7,502,527 | B2 * | 3/2009 | Momose | G06T 11/60 358/1.18 |
| 8,168,033 | B1 ‡ | 5/2012 | Mohamad Nor | B65C 9/0006 156/24 |
| 8,570,343 | B2 ‡ | 10/2013 | Halstead | G06T 17/10 345/63 |
| 2005/0273470 | A1 ‡ | 12/2005 | Heigold | H04N 1/3871 |
| 2007/0282696 | A1 ‡ | 12/2007 | Strodtman | G06Q 30/02 705/26 |
| 2009/0139893 | A1 * | 6/2009 | McGonagle | B65D 5/422 206/531 |
| 2012/0072011 | A1 ‡ | 3/2012 | Sarma | G06F 3/1205 700/21 |
| 2013/0250320 | A1 ‡ | 9/2013 | Kishino | G06K 15/1878 358/1.9 |
| 2013/0335464 | A1 ‡ | 12/2013 | Gerber | B41J 3/407 347/4 |
| 2014/0146333 | A1 * | 5/2014 | Shiohara | G06F 3/1293 358/1.13 |

OTHER PUBLICATIONS

Zayarskiy, Vasily, "Developing a Graphic Solution for the Packaging Design of a Line of Food Products", University of Applied Sciences, Bachelor's Thesis 2013, 41 pages.

\* cited by examiner
‡ imported from a related application

GENERATION OF IMAGES

PRIORITY

This application is a Continuation of commonly assigned and co-pending U.S. patent application Ser. No. 15/316,081, filed Dec. 2, 2016, which is a national stage filing under 35 U.S.C 371 of PCT application number PCT/EP2014/061634, having an international filing date of Jun. 4, 2014, titled "GENERATION OF IMAGES". The disclosures of the U.S. patent application and the International Patent Application are hereby incorporated by reference in their entireties.

BACKGROUND

Many items are packaged before sale to consumers. In some case, the packaging may be intended to remain with the item when it is in use. For example, beverages may be consumed or served direct from the bottles that act as the packaging for the beverage. In other cases, the packaging may be discarded without affecting the use of the product. For example, electronic devices may be sold in boxes made of folded cardboard for protection, but the box may not be retained after the device has been purchased. Packaging typically includes images intended to attract the consumers.

BRIEF DESCRIPTION OF THE DRAWINGS

For a better understanding of examples described herein, and to show more clearly how the examples may be carried into effect, reference will now be made, by way of example only, to the following drawings in which.

DETAILED DESCRIPTION OF EXAMPLE EMBODIMENTS

Figure 1:
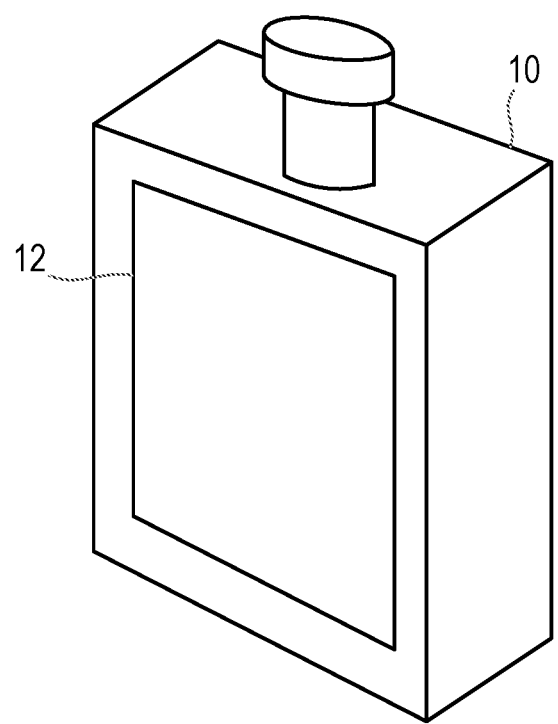
FIG. 1 shows a first consumer product.

FIG. 1 shows a consumer product in the form of a bottle 10, for example containing a beverage. The bottle 10 acts as a part of the packaging of the beverage, and it is expected that the beverage may be kept in the bottle 10 while it is being used. Thus, the beverage may be consumed direct from the bottle 10, or may be dispensed from the bottle 10 at the time of use.

A label 12 is applied to the bottle 10. The label 12 may contain legally required product information, and may also contain advertising material such as a manufacturer's trade mark. In addition, the label 12 contains decorative material. Alternatively, this material may be printed directly onto packaging, such as a bottle or other drinks container such as a can.

Figure 2:
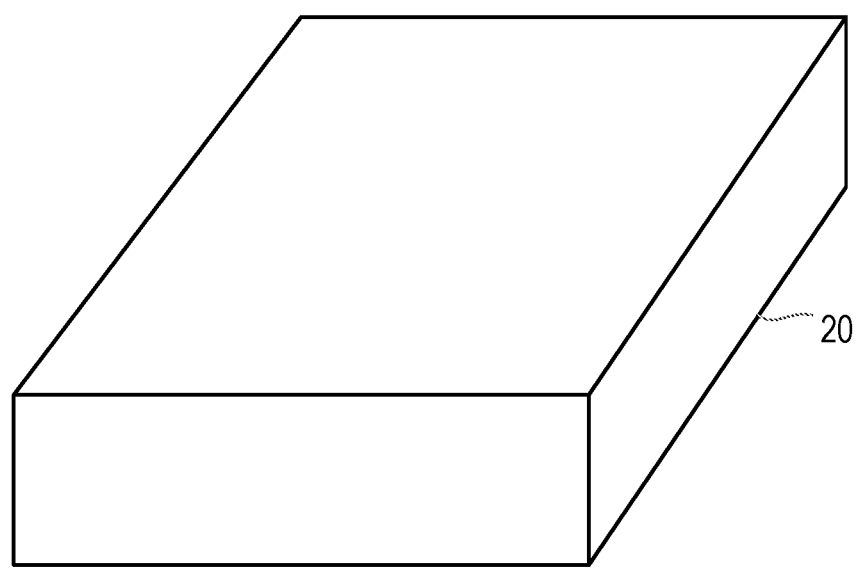
FIG. 2 shows a second consumer product.

FIG. 2 shows a second consumer product in its packaging. In this case, the packaging is in the form of a box 20, made of cardboard or a similar material. The product is supplied within its packaging, and it is expected that the product will be removed from its packaging before its first use. The packaging may then be discarded. The box 20 may have printed on it legally required product information, advertising material such as a manufacturer's trade mark, and decorative material.

Figure 3:
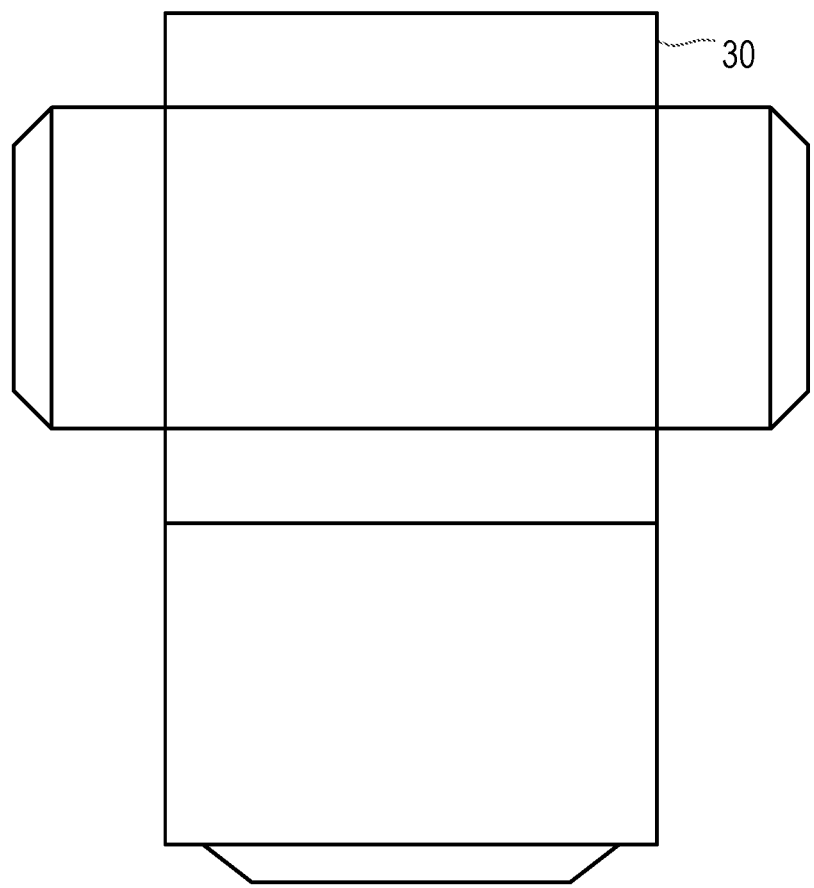
FIG. 3 shows a packaging item associated with the second consumer product.

FIG. 3 shows how the box 20 is formed from a blank 30, made of cardboard or a similar material, that can be folded to produce the box. The legally required product information, the advertising material, and the decorative material may be printed on the blank 30 before folding to make the box 20. Alternatively, the material may be printed onto a sheet material before the blank is cut out and folded to make the box.

In many cases, it is intended that the packaging of a mass-produced consumer item should be completely consistent for every individual item. It is now recognized that it would be desirable in some cases for every individual item to be provided with unique packaging, in order to generate attachment between the consumer and the item. However, if this is achieved by modifications to the manufacturing machinery, the cost is likely to be prohibitive for many possible applications.

Figure 4:
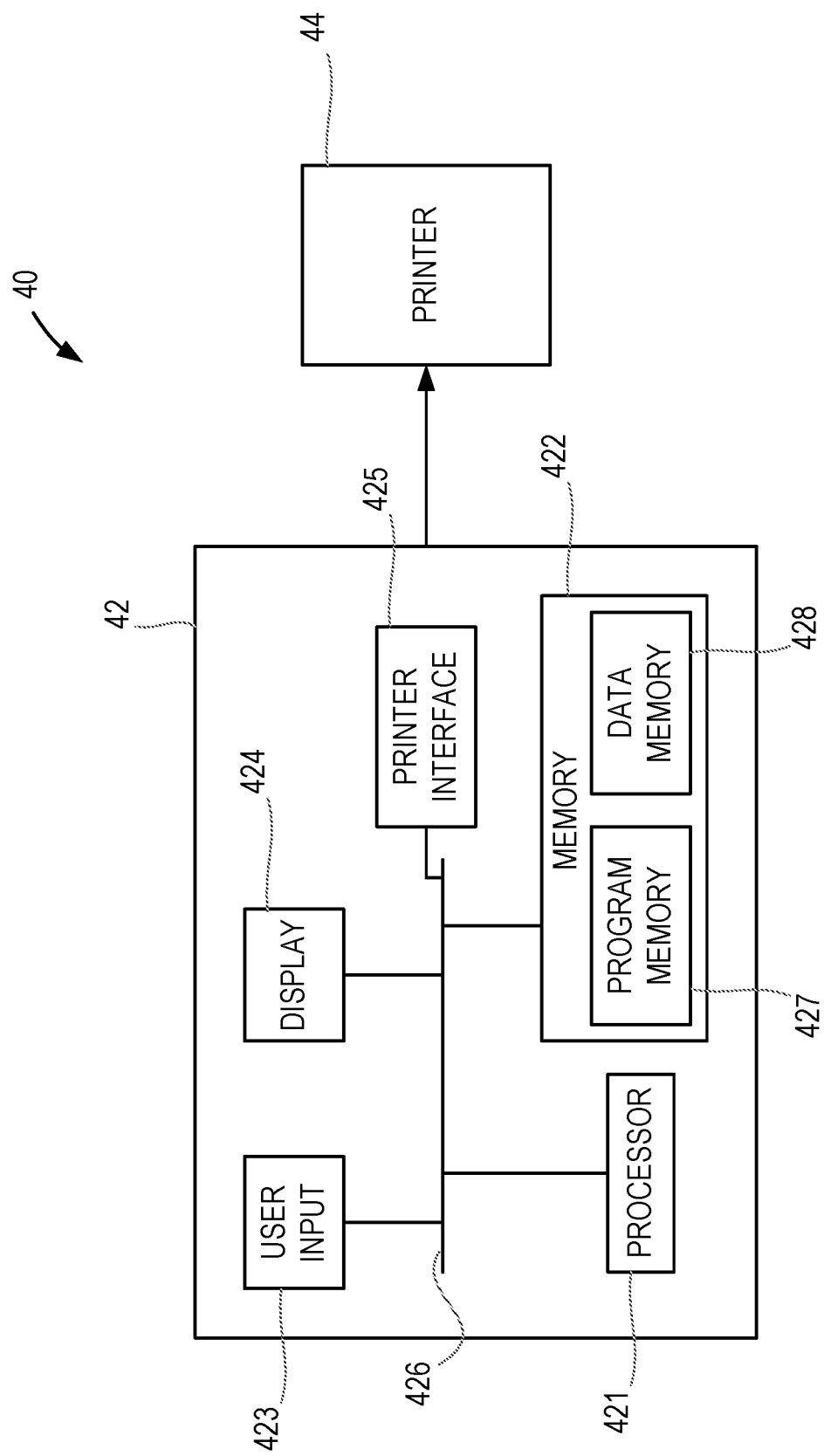
FIG. 4 shows a printing system according to an example.

FIG. 4 illustrates a printing system 40 for use in some examples. In this example, the printing system includes a computer system 42 and a printer 44.

The computer system 42 acts as a printer controller and includes a processor 421, a memory 422, a user input 423, a display 424 and a printer interface 425, all interconnected by a bus system 426. The memory 427 includes a program memory 427 and a data memory 428. The program memory 427 stores machine readable instructions suitable for causing the processor 421 to carry out the processes described herein.

The computer system 42 is shown here as a single device but, in other embodiments, the relevant components may be distributed between multiple devices, which may be present at different locations. The computer system 42 acting as the printer controller may be associated with the printer 44, or may be separate therefrom. Thus, the computer system 42 may act as the printer controller for multiple printers. The multiple printers may be located at a single site, or may be located at multiple sites, including at multiple geographical locations. In that case, the computer system 42 can act such that each packaging item printed at a site is unique, even when considering the items printed at the other sites.

Although in this example a printer is illustrated and described, other image forming systems may be used for applying an image to an item.

Figure 5:
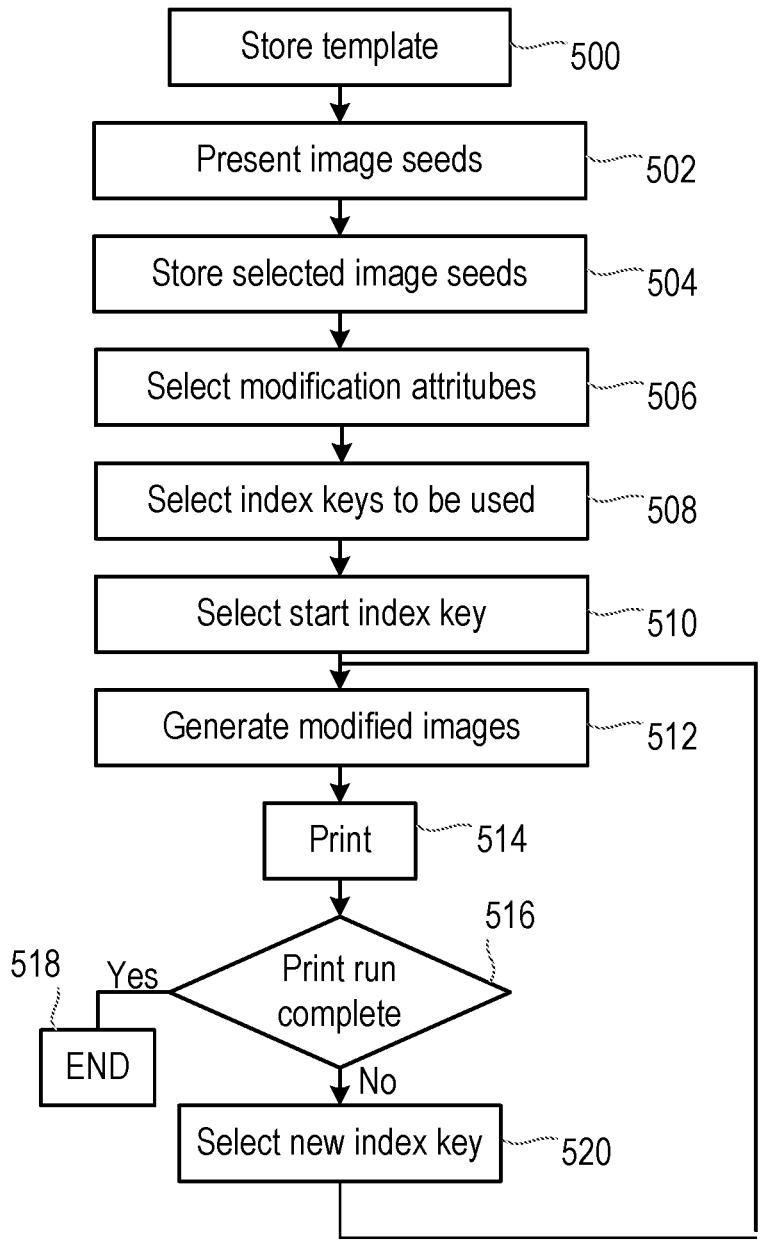
FIG. 5 is a flow chart, illustrating a process as an example of the present invention.

FIG. 5 is a flow chart, illustrating a process as an example of the invention. Although the process of FIG. 5 is described with reference to its use in printing a packaging item, the same process can be used to generate images for any type of item.

To start the process, a user produces a template for a design of a packaging item. For example, in the case of a product of the type shown in FIG. 1, the packaging item may be the label 12 that is intended to be applied to the bottle 10. In the case of a product of the type shown in FIG. 2, the packaging item may be the cardboard blank 30, which is intended to be used to form the box 20.

The template may be produced using a software package intended for such design work, for example such as the HP SmartStream Designer™ software package running on the computer system 42, or may be produced in some other format on a separate computer system.

In step 500 of the process shown in FIG. 5, the computer system 42 stores the template for the design of the packaging item. This may apply whether the template was created using the computer system 42 or was created in some other way.

Figure 6:
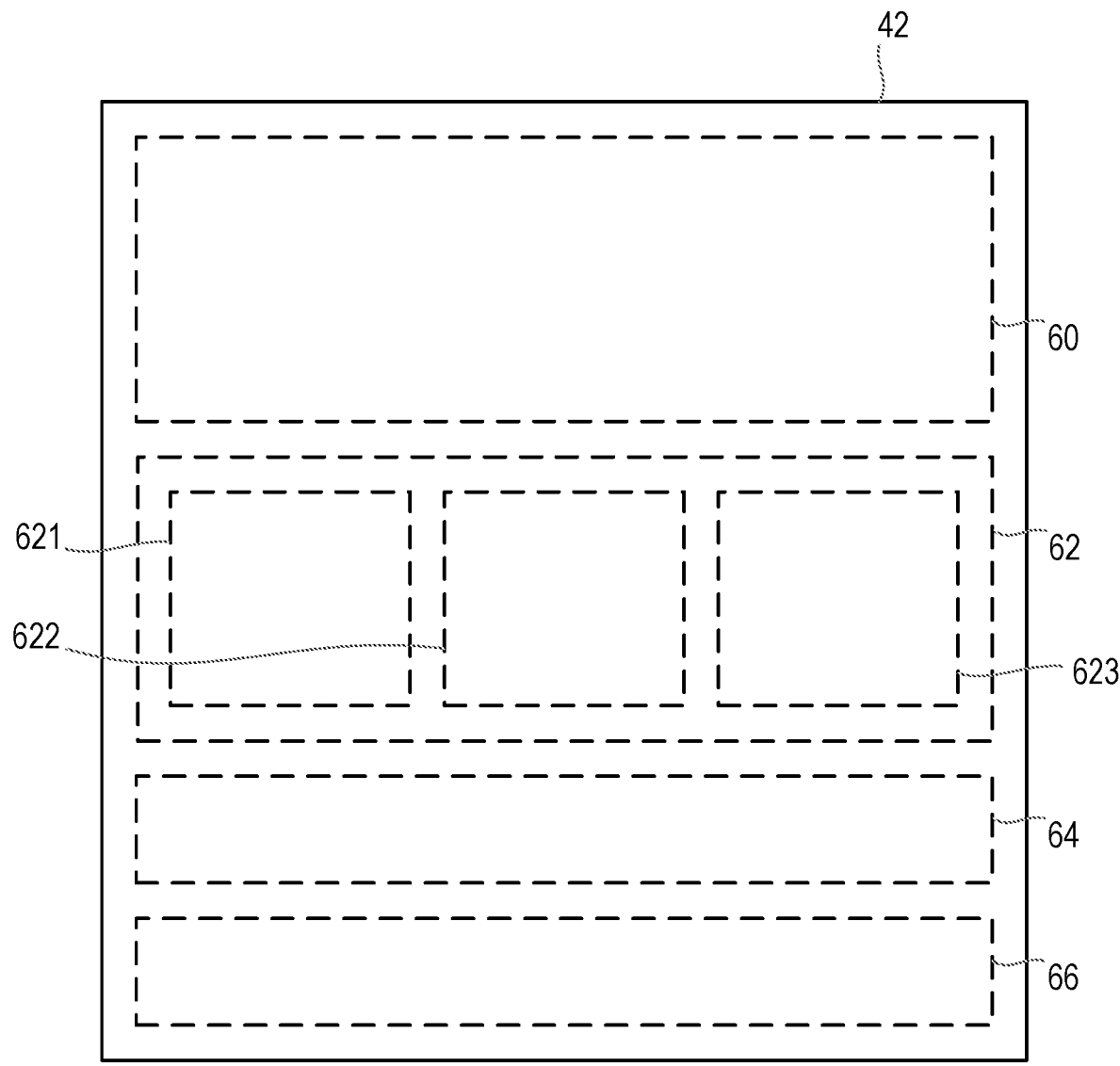
FIG. 6 shows a packaging item at a first stage in the process of FIG. 5.

FIG. 6 shows an example of a template design for the label 12. Specifically, in this example, the template contains four separate areas 60, 62, 64, 66. In this example, the first area 60 is intended to contain material that will be the same on every printed label, such as basic information about the product, and a manufacturer's logo, as examples.

The second area 62 is intended to contain an image that differs from one printed label to the next, as described in more detail below.

The third area 64 is intended to contain an index key that also differs from one printed label to the next, again as described in more detail below.

The fourth area 66 is intended to contain additional material that will be the same on every printed label, such as legally required information that is specific to the product.

In this example, the second area 62 contains three variable image channels 621, 622, 623, but the number of image channels may be as small as one or as large as required to produce the intended degree of image variety.

In step 502 of the process shown in FIG. 5, the computer system 42 presents the user with a number of possible image seeds for each of the variable image channels 621, 622, 623. For example, the user may be presented on the display 424 of the computer system 42 with multiple image seeds, and may select one of the available image seeds for each of the variable image channels 621, 622, 623 by means of the user input device 423 of the computer system 42. As an example, the multiple image seeds may be simple geometrical shapes. Other images may also be provided as image seeds, for example in the form of pictures, or complex forms such as Mandelbrot fractals.

The user may select a single image seed to be used in each of the variable image channels 621, 622, 623, or the user may be able to select a different image seed for each of the variable image channels 621, 622, 623.

In step 504 of the process shown in FIG. 5, the computer system 42 stores the respective image seeds selected by the user for each of the variable image channels 621, 622, 623.

In this example, the computer system 42 presents the user with a set of modification attributes. In response, the user selects a subset of these modification attributes that can be applied to the image seeds. In another example, the computer system 42 selects a set of modification attributes that can be applied to the image seeds. In either case, in step 506, the selected modification attributes are stored.

For example, the modification attributes may be a degree of magnification (or zooming), a degree of rotation, a degree of lateral movement of the image seeds in horizontal and vertical directions, reflection of the image seeds, distortion or skewing of the image seeds, and colorization or transparency effects to be applied to the image seeds. The set of available modification attributes may be the same for each of the image seeds, or may be different between the different image seeds. The set of available modification attributes may depend on the image seed that was selected by the user, or the set of available modification attributes may be the same for each of the available image seeds. For each modification attribute, there may be a range of possible values. For example, where the modification attribute is the amount of zooming, there may be a maximum zoom and a minimum zoom, giving a maximum size and a minimum size of the resultant modified image. Where the modification attribute is the amount of distortion, there may be a maximum amount and a minimum amount, giving maximally and a minimally distorted modified images. The user may select the full range of possible values to be available, or may select a subset of the possible values from the range.

Thus, as another example, where one of the modification attributes relates to colorization, the range of modifications that the computer system 42 presents to the user may include a full palette of colours. In response, the user may for example select a subset of those colours.

In step 508, the computer system selects a set of index keys to be used. Each index key is a piece of data, and the set of index keys is chosen such that it is possible to associate a different index key with each label 12 that is intended to be printed.

As an illustrative example, the set of index keys could be the set of all 9 digit numbers, and this would allow one billion ($10^9$) unique index keys to be chosen. Similarly, the set of index keys could be a set of combinations of nine letters. If the set of index keys is the set of all combinations of 9 letters, this would allow $26^9$ unique index keys to be chosen. The index keys could also be a combination of letters and digits. For example, each index key may include a group of letters that act as an identifying code of some sort, plus a group of digits that act as a sub-identifier.

In step 510, the computer system selects a start index key from the set of index keys. The start index key may be selected in such a way that every index key is only ever used once, and hence that the index key itself identifies the template and the selected image seeds.

In step 512, the computer system uses the current index key to generate modified images from the respective image seeds selected by the user for each of the variable image channels 621, 622, 623.

The composition of the images may be performed using a suitable software package, for example with a suitable modification to the HP SmartStream Composer™ software package running on the computer system 42.

The system is provided with a method for performing modifications to the image seeds, where the specific modifications that are performed depend on the current index key. In certain embodiments, there is a 1:1 mapping from the index key to the modified images. That is, each index key results in a unique modified image.

In step 514, the computer system generates an output, which may for example be in the form of a .JPG file or a .PDF file. The output file may be available for preview, or may be sent direct to the printer 44 for printing on the label 12 or other packaging item.

The output may include the modified images and the current index key, so that the images and the index key can be printed on the item. The output may include a single set of modified images for printing on a single item. Alternatively, multiple sets of modified images, for printing on respective item, can be provided in a single output file in a suitable format.

As mentioned above, the respective index key may also be printed on each item, in the area 64 in the example shown in FIG. 6. Where the index key contains digits and/or letters, these can be represented in a primarily human-readable form, for example as text, or can be represented in a primarily machine-readable form, for example as a barcode, as a quick response (QR) code, or as Personalized URL (PURL). In addition, information identifying the template and the selected image seeds may be printed at this stage.

In step 516, it is determined whether the print run is complete, that is, whether all required items have been printed. If so, the process passes to step 518, and ends. If not, the process passes to step 520, in which a new index key is generated, for example by incrementing the previous index key.

The process then returns to step 512, and a new set of modified images is generated from the new index key.

When the packaging item has been printed, it is applied to the consumer product. Where the packaging item is a label, it is applied to the product container. Where the packaging item is a blank for a box, or the like, the box is constructed from the blank and the product is inserted.

Thus, this enables easy generation of very large numbers of unique packages, to generate interest among consumers and a high degree of attachment to the unique product that they buy. This increases the possibility that the package itself will be regarded as collectable, and allows the end user to order other items with the same guaranteed unique image.

Figure 7:
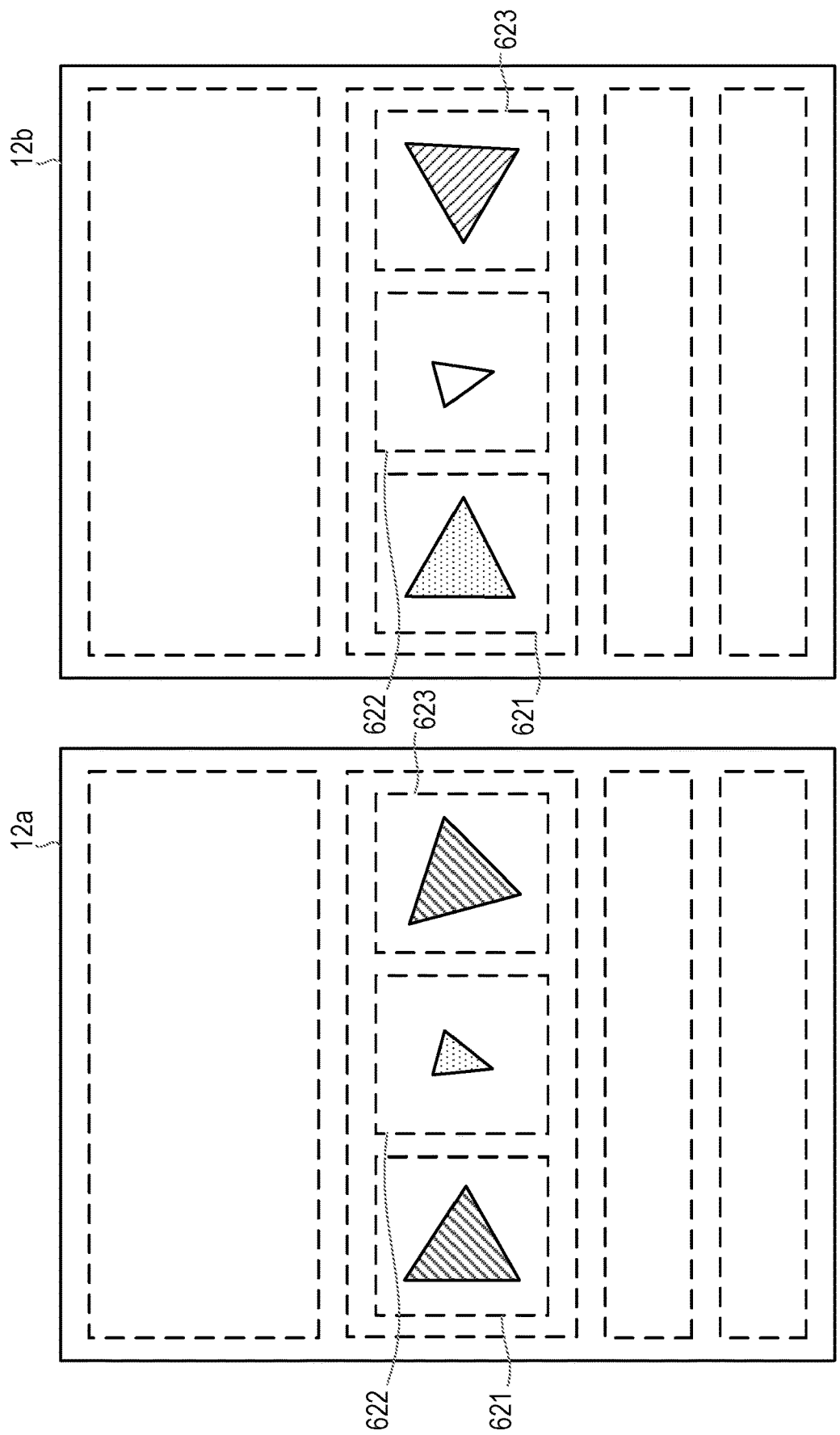
FIG. 7 shows multiple packaging items at a second stage in the process of FIG. 5.

FIG. 7 illustrates two labels 12*a*, 12*b* generated by successive iterations of the process shown in FIG. 5.

In this simple example case, the image seeds selected by the user for each of the variable image channels 621, 622, 623 are all equilateral triangles. The set of modification attributes that can be applied to the image seeds comprises ten different sizes, ten different rotation angles, and ten different colours. The set of index keys comprises the set of all 9 digit numbers.

Thus, a first digit in the index key is used to determine the size of the equilateral triangle in the image channel 621, a second digit in the index key is used to determine a rotation angle of the equilateral triangle in the image channel 621, a third digit in the index key is used to determine a colour of the equilateral triangle in the image channel 621, a fourth digit in the index key is used to determine the size of the equilateral triangle in the image channel 622, a fifth digit in the index key is used to determine a rotation angle of the equilateral triangle in the image channel 622, a sixth digit in the index key is used to determine a colour of the equilateral triangle in the image channel 622, a seventh digit in the index key is used to determine the size of the equilateral triangle in the image channel 623, an eighth digit in the index key is used to determine a rotation angle of the equilateral triangle in the image channel 623, and a ninth digit in the index key is used to determine a colour of the equilateral triangle in the image channel 623.

In other embodiments, different modification attributes are applied to different items. One way to achieve this is to select a first set of modification attributes, but to set a maximum index value for which that set of modification attributes applies. For example, index values in the range from 1-100000 may define one set of attributes, while indexes from 100001 upwards define a different set of attributes.

In some embodiments, the process shown in FIG. 5 proceeds by incrementing the index key by 1 at each iteration of step 520, and the process by which the index key value maps to the attribute modifications is a generally linear process. Thus, a series of items produced from successive index keys might differ from each other only slightly.

In other embodiments, the process by which the index key determines the properties of the final image can be regarded as a pseudorandom process, so that a series of items produced from successive index keys are significantly different from each other. For example, the index key is used as an input to a pseudorandom number generator, with the output pseudorandom number being used to determine the attribute modifications to be applied to the image seed or seeds. This has the advantage that a series of items produced successively might differ from each other quite significantly, thereby producing a more visually distinctive appearance when the products are displayed together. It is also advantageous in this embodiment that the index key is applied to a pseudorandom number generator, and not a true random number generator, to determine the attribute modifications that are to be applied, because this makes it possible to generate the same final image repeatedly by using the same index key.

Thus, in FIG. 7, in the first label 12*a*, the equilateral triangle in the image channel 621 has a first size, a first rotation angle, and a first colour; the equilateral triangle in the image channel 622 has a second size, a second rotation angle, and a second colour; and the equilateral triangle in the image channel 623 has the first size, a third rotation angle, and the first colour. In the second label 12*b*, the equilateral triangle in the image channel 621 has the first size, the first rotation angle, and the second colour; the equilateral triangle in the image channel 622 has the second size, a fourth rotation angle, and a third colour; and the equilateral triangle in the image channel 623 has the first size, a fifth rotation angle, and the first colour.

As described above, one example of the process is in printing items that will be distributed to the public, and the intention is that the number of available index keys, and hence the number of different images that can be printed, will exceed the number of images that are actually printed. Therefore, each image is unique.

An advantage of printing the index key with the image is that the consumer can supply the manufacturer with the index key, and the same image can be reprinted because the modifications that are performed are determined by the image key alone, and every index key results in a unique image. Because the images themselves are created on the fly, they may be deleted after production, avoiding the need for large dedicated memory for storing the images that are created.

Figure 8:
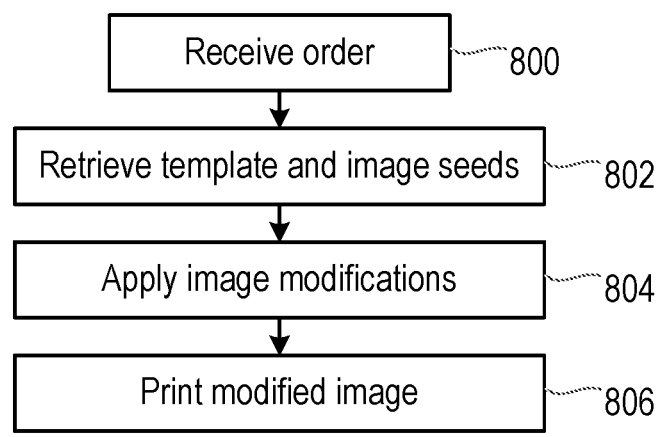
FIG. 8 shows a further process by way of an example.

FIG. 8 shows a process of reprinting the image.

In step 800, the system receives an order specifying an index key. For example, the order may be received from a purchaser of a first consumer item to which a unique image, and the associated index key, were applied.

In step 802, the system retrieves the template and the selected image seeds. As described above, the index key may itself uniquely define the template and the image seeds, or the printed index key may be associated with other information identifying the template and the image seeds. As another alternative, the order received at step 800 may identify the template and the image seeds in some other way, for example by identifying the first consumer item to which the unique image was applied.

In step 804, the image modifications corresponding to the index key are identified, and applied to the image seeds. As described above, there may be a 1:1 mapping between the image seeds and the image modifications, so that applying the image modifications results in the same unique image that was applied to the first consumer item.

In step 806, the resulting modified image is printed on a second consumer item. The material that is printed on the second consumer item may be only the customer's unique image, or may also include other material from the original printed item, such as basic information about the first product, or a manufacturer's logo. The index key may also be printed on the second consumer item, allowing the process of FIG. 8 to be repeated as often as required.

Thus, the manufacturer can provide merchandise items, such as T-shirts, mugs or the like, and can print the consumer's unique image on to the merchandise item on request.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of manufacturing a package, comprising:
    identifying, by a processor, a package template comprising an image area;
    receiving, by the processor, an image seed to be used in the image area of the package template;
    identifying, by the processor, a plurality of ranges of image attribute modifications to be applied to the image seed, wherein each of the plurality of ranges of image attribute modifications is mapped to a respective index key;
    selecting, by the processor, an index key unique to the package, wherein the index key identifies a range of image attribute modifications;
    determining, by the processor, the range of image attribute modifications based on the selected index key;
    applying, by the processor, the determined range of image attribute modifications to the image seed to generate an image; and
    applying, by the processor, the generated image to the image area of the package template to manufacture the package.

2. The method according to claim 1, further comprising:
    printing the generated image onto a label; and
    wherein applying the generated image to the image area of the package template comprises applying the printed label to the image area of the package template.

3. The method according to claim 1, further comprising:
    printing the generated image onto a blank; and
    wherein applying the generated image to the image area of the package template comprises forming the package from the printed blank.

4. The method according to claim 1, wherein applying the generated image to the image area of the package template comprises printing the generated image directly onto the package template.

5. The method according to claim 1, wherein the image attribute modifications to be applied to the image seed include at least one of: zooming of the image seed, rotation of the image seed, translation of the image seed, and distortion of the image seed.

6. The method according to claim 1, wherein the image attribute modifications to be applied to the image seed include modifications of a colorization of the image seed.

7. The method according to claim 1, wherein the image attribute modifications to be applied to the image seed include modifications of transparency effects to the image seed.

8. The method according to claim 1, wherein selecting the index key unique to the package comprises applying a pseudorandom process to select the index key unique to the package.

9. The method according to claim 1, further comprising: manufacturing a subsequent package by:
    accessing an index key unique to the subsequent package;
    determining a range of image attribute modifications assigned to the accessed index key;
    applying the determined range of image attribute modifications to the image seed to generate an image for the subsequent package; and
    applying the generated image to the subsequent package.

10. The method according to claim 1, wherein the index key includes a plurality of digits and wherein each of the plurality of digits corresponds to a different image attribute modification to be applied to the image seed.

11. A printing system, comprising:
    a printer; and
    a printer controller to:
        identify a package template comprising an image area;
        receive an image seed to be used in the image area of the package template;
        identify a plurality of ranges of image attribute modifications to be applied to the image seed, wherein each of the plurality of ranges of image attribute modifications is mapped to a respective index key;
        select an index key unique to a package, wherein the index key identifies a range of image attribute modifications;
        determine the range of image attribute modifications based on the selected index key;
        apply the determined range of image attribute modifications to the image seed to generate an image; and
        apply the generated image to the image area of the package template to manufacture the package.

12. The printing system according to claim 11, wherein the image attribute modifications to be applied to the image seed include at least one of: zooming of the image seed, rotation of the image seed, translation of the image seed, and distortion of the image seed.

13. The printing system according to claim 11, wherein the index key includes a plurality of digits and wherein each of the plurality of digits corresponds to a different image attribute modification to be applied to the image seed.

14. The printing system according to claim 11, wherein, to select the index key unique to the package, the printer controller is to apply a pseudorandom process to select the index key unique to the package.

15. A non-transitory machine-readable storage medium storing instructions that when executed by a processor cause the processor to:
    identify a package template comprising an image area;
    receive an image seed to be used in the image area of the package template;
    identify a plurality of ranges of image attribute modifications to be applied to the image seed, wherein each of the plurality of ranges of image attribute modifications is mapped to a respective index key;
    select an index key unique to a package, wherein the index key identifies a range of image attribute modifications;
    determine the range of image attribute modifications based on the selected index key;
    apply the determined range of image attribute modifications to the image seed to generate an image; and
    apply the generated image to the image area of the package template to manufacture the package.

16. The non-transitory machine-readable storage medium according to claim 15, wherein the image attribute modifications to be applied to the image seed include at least one of: zooming of the image seed, rotation of the image seed, translation of the image seed, and distortion of the image seed.

17. The non-transitory machine-readable storage medium according to claim 15, wherein the index key includes a plurality of digits and wherein each of the plurality of digits corresponds to a different attribute modification for the image seed.

18. The non-transitory machine-readable storage medium according to claim 15, wherein, to select the index key unique to the package, the instructions are executable to cause the processor to apply a pseudorandom process to select the index key unique to the package.

* * * * *